United States Patent [19]

Satzinger

[11] 4,076,306
[45] Feb. 28, 1978

[54] VEHICLE SEAT REST

[76] Inventor: Roland Satzinger, Hammelburger Str. 21a, D-8731 Euerdorf, Germany

[21] Appl. No.: 721,722

[22] Filed: Sep. 9, 1976

[30] Foreign Application Priority Data

Oct. 15, 1975 Germany .............................. 2546157

[51] Int. Cl.² .............................................. B60R 21/10
[52] U.S. Cl. ..................................... 297/216; 297/389
[58] Field of Search .............. 297/216, 450, 389, 385, 297/384; 296/35 R; 280/744, 746, 747

[56] References Cited

U.S. PATENT DOCUMENTS

| 3,145,051 | 8/1964 | Rausch | 297/216 |
|---|---|---|---|
| 3,501,200 | 3/1970 | Ohta | 297/216 X |
| 3,544,164 | 12/1970 | Ohta | 297/216 |
| 3,545,808 | 12/1970 | Gescheidle | 297/216 |
| 3,619,006 | 11/1971 | Barecki | 297/450 |
| 3,877,748 | 4/1975 | Eggert | 297/216 |

Primary Examiner—James T. McCall
Attorney, Agent, or Firm—Burgess, Dinklage & Sprung

[57] ABSTRACT

An improvement in a vehicle seat rest having a shoulder belt, one end of which is fastened to said rest, toward the top thereof, said belt running obliquely across said rest to a belt lock on the opposed side thereof, said vehicle seat rest improved in that the vehicle seat rest has a rectangular frame and a rigid cross-stay running from the region of the point to which said belt is attached at the top of said rest obliquely in the same direction as said belt to the region of said belt lock. There is also disclosed the use of a cross-stay which is incompressible under maximum loading. Also disclosed is a rectangular frame having a deformable section therein.

4 Claims, 3 Drawing Figures

VEHICLE SEAT REST

BACKGROUND OF THE INVENTION

1. Field of the Invention

This invention relates to a vehicle seat rest improved by having a rectangular frame therein which has running across the same in the direction of a vehicle shoulder safety belt a rigid cross-stay joining one portion of the rectangular frame to a diagonally opposed portion. More especially, this invention relates to a vehicle seat rest with a rectangular frame and a shoulder belt, which belt is fastened at one end toward the top thereof and runs obliquely across the rest to a belt lock. This invention is concerned with an improved vehicle seat rest which reduces the likelihood of neck injury in the event of a side crash of a vehicle within which the vehicle seat rest is contained.

2. Discussion of the Prior Art

Vehicle seat rests having shoulder belts which are attached to the upper section of the seat rest and run obliquely across a passenger, to be connected to a belt lock at a lower portion of the seat diagonally therebelow, are known. The shoulder belt is in this case fastened to the corner point region of the rest and runs obliquely across the rest to the belt lock, which is, for example, fastened to the seat. These known seat rests must as a rule be constructed to be so firm that in the case of a frontal crash, they do not deform under the influence of the forces exerted on the fastening points of the belts. Thereby the seat rest becomes too rigid and unyielding for side crashes. It is in these side crashes that heavy neck injuries can arise due to the shoulder belt and the movement imparted to the occupant against the belt. The material effort is, moreover, relatively great in the case of these prior art vehicle seat rests.

Accordingly, it is an object of the present invention to provide a vehicle seat rest of the initially described type which is improved so that it is adequately rigid to handle frontal crashes and yet is yielding to an exactly determinable extent in the case of a side crash. Moreover, it is an object of the present invention to provide such an improved vehicle seat rest whereby the material employed to improve the same is relatively small.

SUMMARY OF THE INVENTION

The objects of the present invention are accomplished in a vehicle seat rest having a shoulder belt, one end of which is fastened to said rest, said belt running obliquely across said rest to a belt lock on the opposed side thereof, the vehicle seat rest being improved in that the vehicle seat rest has a rectangular frame and a rigid cross-stay running from the region of the point at which said belt is attached obliquely in the same direction as said belt to the region of said belt lock. It should be understood that the cross-stay joins one portion of the rectangular frame to another. Preferably, there is employed a single rigid cross-stay which is one which is incompressible under maximum loading.

The provision of this cross-stay prevents a pulling together or reduction of the spacing of the fastening points of the shoulder belt, whereby the angle of application of the belt to the body of the vehicle occupant remains constant. Accordingly, an optimum effect of the belt is attained in every case. The safety system can be used to effectively retain the vehicle occupant in the seat safely, both in respect of frontal crashes and side crashes.

Preferably the shoulder belt employed is one which has a slight degree of elasticity and stretches slightly during use. To prevent the danger of neck injuries in the case of a side crash with the use of slightly stretching belt tapes, according to another feature of the invention, one of the long sides of the rectangular frame is provided with a deformable section. Preferably, the long side provided with the deformable section is that side which runs from the upper fastening point of the shoulder belt to the seat, i.e., it is the side opposed to the belt lock. Thereby the rest can give way to the side in the case of a side crash. The deformable section is so constructed that the rest yields on a certain lateral force without the spacing of the fastening points of the shoulder belt varying. Thus, the angle of application of the belt to the body of the vehicle occupant remains constant even during a side crash. In such a way, neck injuries by tension of the belt tape on the occupant are avoided.

The present invention will be more readily understood and appreciated when reference is made to the accompanying drawings, in which.

Figure 1:
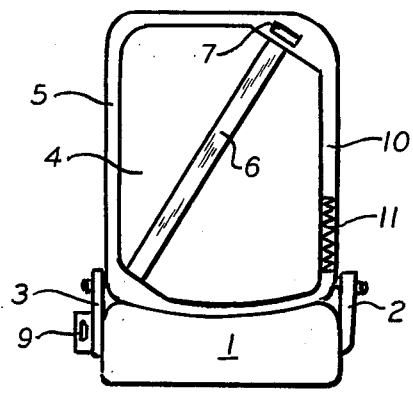
FIG. 1 is a frontal elevation of the seat with seat rest, wherein the upholstery layers and the shoulder belt have been removed.
Figure 2:
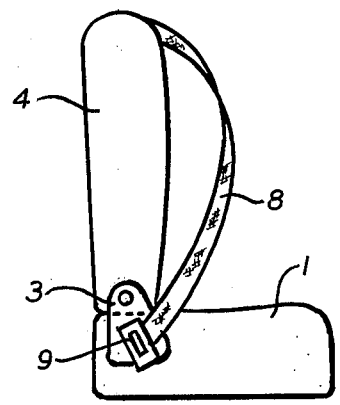
FIG. 2 is a side elevation of the seat with seat rest according to FIG. 1.

In the drawings, to more readily appreciate the invention, the usual body safety belt which runs across the waist of the occupant is not shown.

DESCRIPTION OF SPECIFIC EMBODIMENTS

The seat rest 4 is fastened to seat 1 by metal fittings 2 and 3. The seat rest 4 comprises a rectangular frame and a single rigid cross-stay 6. This cross-stay runs obliquely across the rectangular frame in the same way in which the belt runs across the seat, i.e., from the region of the fastening point 7 at the upper end of the seat rest toward the region of the belt lock 9 into which the shoulder belt 8 is engaged while the safety system is in use. The cross-stay 6 ends in the region of the frame 5 in the proximity of which is disposed the belt lock 9 of the shoulder belt. The cross-stay 6 and shoulder belt 8 thus run in the same direction. The long side 10 of the frame, which runs from fastening point 7 for the shoulder belt downwardly to the seat 1, displays a section 11 which is deformable under the influence of a certain side force on the rest. The deformable section preferably comprises a coil spring, as shown.

Figure 3:
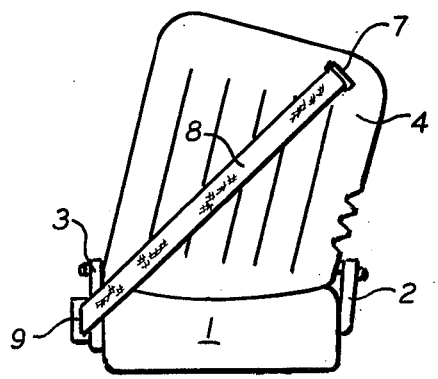
FIG. 3 is a frontal elevation of the seat with the seat rest after a side crash.

By the described assembly according to the invention, in the case of a side crash and due to provision of the rigid cross-stay 6, the spacing between the fastening points of the shoulder belt is not varied. Due to the deformable section 11 of the long side of the frame, in accordance with the preferred embodiment of the invention, the seat rest can buckle laterally as shown in FIG. 3 while maintaining the spacing between the fastening points of the shoulder belt constant. The rest, in effect, pivots around the support point of the cross-stay in the region of the belt lock 9. This movement corresponds largely to the movement of the vehicle occupants.

By these measures it is assured, on the one hand, that the angle of application of the belt remains constant to the body of the vehicle, while, on the other hand, neck injuries are largely avoided by the belt tape. The material effort for the seat rest is obviously kept relatively small. The absolutely optimum effect of the invention is attained, then, when the seat and rest are supported in an energy consuming manner relative to the vehicle chassis, as has been described in my patents.

What is claimed is:

1. In a vehicle seat rest having a shoulder belt, one end of which is fastened to said rest, said belt running obliquely across said rest to a belt lock on the opposed side thereof, the improvement wherein said seat rest has a rectangular frame including two vertical sides, means disposed on one vertical side for effecting deformation thereof in response to a substantially perpendicular force applied to the opposite vertical side and means comprising a rigid cross-stay running from the region of the point to which said belt is attached obliquely in the same direction as said belt to the region of said belt lock for both preventing a reduction in the distance between the fastening points of the shoulder belt and maintaining a constant angle of application of the belt to the held body during application of the force and deformation of the one vertical side.

2. A vehicle seat rest according to claim 1 wherein the cross-stay comprises a single member.

3. A vehicle seat rest according to claim 1 wherein said cross-stay is incompressible under maximum loading.

4. A vehicle seat rest according to claim 1 wherein said vertical sides of the rectangular frame comprise a pair of opposed long sides, the long side opposite said belt lock having therein the deformable means.

* * * * *